United States Patent
Verardi et al.

(10) Patent No.: US 12,184,150 B2
(45) Date of Patent: Dec. 31, 2024

(54) ROTARY ELECTRIC MACHINE AND OIL TANK FOR A ROTARY ELECTRIC MACHINE

(71) Applicant: WEG EQUIPAMENTOS ELÉTRICOS S.A., Jaragua do Sul (BR)

(72) Inventors: Marcelo Verardi, Joinville (BR); Thiago Schwinden Leal, Jaragua do Sul (BR); Douglas Eyng Fritzen, Jaragua do Sul (BR); Cassiano Antunes Cezario, Jaragua do Sul (BR)

(73) Assignee: WEG EQUIPAMENTOS ELÉTRICOS S.A., Jaragua do Sul (BR)

( * ) Notice: Subject to any disclaimer, the term of this patent is extended or adjusted under 35 U.S.C. 154(b) by 337 days.

(21) Appl. No.: 17/626,607

(22) PCT Filed: Jul. 12, 2019

(86) PCT No.: PCT/BR2019/050271
§ 371 (c)(1),
(2) Date: Jan. 12, 2022

(87) PCT Pub. No.: WO2021/007627
PCT Pub. Date: Jan. 21, 2021

(65) Prior Publication Data
US 2022/0200394 A1    Jun. 23, 2022

(51) Int. Cl.
*H02K 5/20* (2006.01)
*H02K 9/14* (2006.01)
*H02K 9/197* (2006.01)

(52) U.S. Cl.
CPC ............. *H02K 5/20* (2013.01); *H02K 9/14* (2013.01); *H02K 9/197* (2013.01)

(58) Field of Classification Search
None
See application file for complete search history.

(56) References Cited

U.S. PATENT DOCUMENTS

| 2,494,200 A | * | 1/1950 | Ramqvist | H02K 9/06 310/52 |
| 3,870,907 A | | 3/1975 | Hoffman | |
| 8,203,241 B2 | | 6/2012 | Tanaka | |

(Continued)

FOREIGN PATENT DOCUMENTS

| JP | 60-245442 | 5/1987 |
| JP | 4253478 | 4/2009 |

OTHER PUBLICATIONS

International Search Report for PCT/BR2019/050271 dated Feb. 27, 2020.

*Primary Examiner* — Bernard Rojas
(74) *Attorney, Agent, or Firm* — B. Aaron Schulman, Esq.; Stites & Harbison, PLLC (57) ABSTRACT

A rotary electric machine in which the casing containing the rotor/stator assembly comprises an intermediate closing cover that closes one end of the casing, a roller bearing immersed in oil and seated inside the oil tank of the machine, which has a casing with an outer wall that is spaced apart axially from the intermediate closing cover. The spacing between the outer wall and the intermediate closing cover forms a path for air to flow from a fan or a space to be filled with thermally insulating material.

13 Claims, 6 Drawing Sheets

(56) References Cited

U.S. PATENT DOCUMENTS

| | | |
|---|---|---|
| 9,331,552 B2 | 5/2016 | Fedoseyev et al. |
| 9,660,502 B2 | 5/2017 | Matsuki et al. |
| 10,804,764 B2 | 10/2020 | Ramy et al. |
| 2006/0026168 A1 | 2/2006 | Bosworth et al. |
| 2009/0012156 A1 | 1/2009 | Draijer et al. |
| 2019/0097489 A1* | 3/2019 | Ramy .................. H02K 9/04 |

* cited by examiner

PRIOR ART

ROTARY ELECTRIC MACHINE AND OIL TANK FOR A ROTARY ELECTRIC MACHINE

FIELD OF THE INVENTION

The present invention relates to a rotary electric machine having a thermal insulation system to thermally insulate an oil tank from the rotary assembly of the machine.

BACKGROUND OF THE INVENTION

Rotary electric machines are widely known in the art, and basically comprise a static part (stator) and a rotary part (rotor). They can comprise both electric motors and electric generators.

A common concern associated with this type of machine is the need for a ventilation or cooling system that is capable of dissipating the heat generated by the rotor/stator assembly, keeping its internal temperature within pre-established operating limits.

Figure 1:
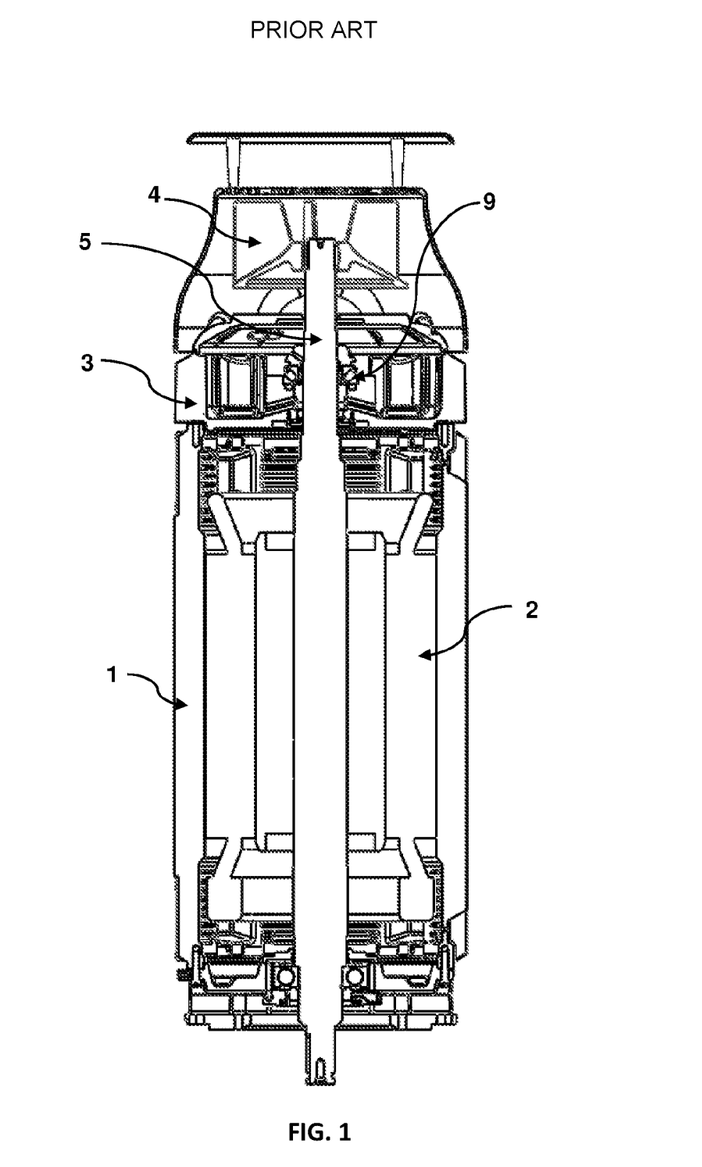
FIG. 1—is a longitudinal sectional view of a rotary electric machine casing commonly used in the state of the art.

FIG. 1 shows a rotary electric machine known from the state of the art. The electric machine comprises a casing 1 defining a cavity where the rotor/stator assembly 2 is installed. An oil tank 3 is connected to the open end of the casing. The oil tank 3 acts as the rear cover of the machine. A fan 4 is coupled to the axis 5 of the machine, adjacent to the fan, and the air flow that flows from the fan has an external trajectory to the assembly formed by the tank and casing. A roller bearing immersed in oil 9 is disposed internally to the tank, making the connection between the tank and the axis 5 of the machine. Thus, in this state of the art construction, the heat generated by the stator coil acts directly on the oil contained in the tank and, consequently, on the roller bearing 9.

It is estimated that of all the heat dissipated by the stator/rotor, a significant portion is directed to the machine's rear bearing, in which the roller bearing is immersed, increasing the losses that the oil will have to dissipate.

Given the need to dissipate not only the heat generated by the roller bearing operation but also the heat generated by the rotor/stator assembly, in this machine construction, the size of the tank needs to increase proportionally to contain a necessary volume of oil that is sufficient to dissipate the heat generated by the roller bearing and coils.

Other cooling solutions for rotary electric machines are known in the art.

Document CN109075652, for example, discloses a system and method for cooling motor components by means of air flow, so that the motor's cooling air flow is reused for heat exchange of other components. For that, the system comprises a channel that allows the direction of the air flow coming from the fan through the closing cover of the motor.

Document JP4253478 describes a roller bearing system for vertical motors comprising an oil tank in which the motor roller bearing is immersed. The outer peripheral wall of the oil tank has fins to direct the air flow coming from the fan, promoting thermal exchange in the device.

Document JP60245442, on the other hand, describes a motor system comprising a roller bearing immersed in an oil tank and the presence of an air flow for cooling and thermal exchange of said oil tank, this air flow not being from the flow of air that cools the motor itself.

Document U.S. Pat. No. 3,870,907 describes a cooling system for vertical motor comprising a roller bearing immersed in oil contained in a tank, so that U-shaped regions are provided for the passage of air flow, which promotes thermal exchange with the oil.

None of the state of the art documents, although focused on cooling systems and thermal exchanges of rotary electric machines components, provide constructions and operations that completely solve the problems identified in relation to the machine construction shown in FIG. 1.

In fact, state of the art solutions that aim to provide some type of thermal barrier between the rotor/stator assembly and the oil tank are solutions that use complex geometries or welded constructions of components, which impact the manufacturing process and costs.

Furthermore, none of the state of the art documents reveal a technical solution that eliminates, with an easy-to-build system, the need for proportionally increasing the volume of the tank in order to provide a modular tank solution and with a fixed oil tank size for different machine dimensions.

Thus, it remains in the state of the art the need for a solution that enables the thermal isolation of the oil tank and allows the assembly and construction of rotary electric machines comprising standardized oil tank sizes for machines of different dimensions.

OBJECTIVES OF THE INVENTION

It is one of the objectives of the present invention to provide a rotary electric machine that enables thermal insulation between the stator/rotor assembly and the interior of the oil tank, while maintaining a simple construction and simple manufacturing.

It is another objective of the present invention to provide a thermal insulation system for rotary electric machine components that minimizes the effects from the heat generated by the motor stator coil.

It is yet another objective of the present invention to provide a rotary electric machine with a thermal insulation system for a tank in which the oil does not need to dissipate additional heat in relation to the roller bearing, with the oil being intended to cool the vertical motor roller bearing/bearing.

It is another objective of the present invention to provide a rotary electric machine with a tank thermal insulation system that does not require variation in the dimensions and volume of the oil tank, regardless of the dimensions and specifications of the motor to which the system is inserted.

It is also an objective of the present invention to provide a rotary electric machine with an oil tank thermal insulation system that allows for factory standardization, leading to an increase in productivity.

It is one more of the objectives of the present invention to provide an oil tank for a rotary electric machine that has a modular construction that can be standardized and applicable to rotary electric machine of different dimensions and specifications.

BRIEF DESCRIPTION OF THE INVENTION

The present invention achieves the objectives mentioned above by means of a rotary electric machine of the type that comprises a casing that delimits an internal volume that houses a rotor/stator assembly, arranged on a main axis of the machine; an oil tank; and a fan coupled on the main axis; wherein the machine comprises an intermediate closing cover that closes one end of the casing, the intermediate closing cover comprising a cavity through which the main axis of the machine passes; the oil tank comprises a casing having an outer wall and an roller bearing immersed in oil disposed internally to the outer wall of the oil tank casing for coupling the oil tank to the main axis of the machine; and the outer wall of the oil tank casing has a spacer protrusion configured to contact the intermediate closing cover to form a spacing between the outer wall of the oil tank casing and the intermediate closing cover.

In one embodiment of the invention, the spacing formed between the outer wall of the oil tank casing and the intermediate closing cover creates a flow path that allows the air flow from the fan to flow adjacent to an outer surface of the intermediate closing cover towards the main axis of the machine.

In another embodiment of the invention, a containment element is arranged at the spacing to delimit a space for receiving a thermally insulating material.

In one embodiment of the invention, the cavity of the intermediate closing cover has a protruding edge and an inner face; and the spacer protrusion of the outer wall of the oil tank casing is in the form of a circular wall with a circular shoulder, wherein the circular wall is configured to contact the protruding edge of the cavity and the circular shoulder is configured to fit against the inner face of the cavity. In this way, the radial fixation is made between the outer wall of the oil tank casing and the intermediate closing cover.

The intermediate closing cover cavity can be configured to receive a guide roller bearing coupled to the main axis of the machine.

The oil tank casing may comprise a cylindrical inner wall and a cylindrical outer wall concentric, the cylindrical inner wall being configured for installation of the immersed roller bearing.

In one embodiment of the invention, the outer wall of the oil tank casing has at least one radial projection having a fastening hole for axial attachment to the intermediate closing cover.

The intermediate closing cover may also comprise at least one radial projection having a fixing hole, wherein the radial projection of the outer wall of the tank casing can be fixed to the corresponding radial projection of the intermediate closing cover, performing the axial fixation between the pieces.

The machine of the present invention can be a vertical fan, wherein the intermediate closing cover is an upper cover, the oil tank is arranged axially above the intermediate closing cover, the outer wall of the oil tank casing is a lower wall, and the fan is arranged above the oil tank casing, so that the air flow from the fan descends externally to the sides of the oil tank casing and flows into the path formed between the lower wall of the oil tank casing and the intermediate closing cover.

The present invention further contemplates an oil tank having a casing with an outer wall shaped with at least one spacer protrusion, the spacer protrusion being configured to contact an intermediate closing cover of the electric machine casing to form a spacing between the outer wall of the oil tank casing and the intermediate closing cover.

In one embodiment of the invention, the spacer protrusion of the outer wall of the oil tank casing is in the form of a circular wall with a circular shoulder for radially attaching the outer wall to a cavity of the intermediate closing cover.

The outer wall of the oil tank casing may also have at least one radial projection having a fastening hole for axial attachment to the intermediate closing cover.

The tank casing may further comprise a cylindrical inner wall and a cylindrical outer wall concentric, the cylindrical inner wall being configured for installation of an inner immersed roller bearing.

BRIEF DESCRIPTION OF THE DRAWINGS

The present invention will be described in more detail below, with references to the attached drawings, in which.

DETAILED DESCRIPTION OF THE INVENTION

The present invention will be described below based on examples of embodiments of the invention shown in FIGS. 2 to 10.

FIGS. 2 to 10 illustrate embodiments of the invention where the electric machine of the present invention is a vertical motor.

Figure 2:
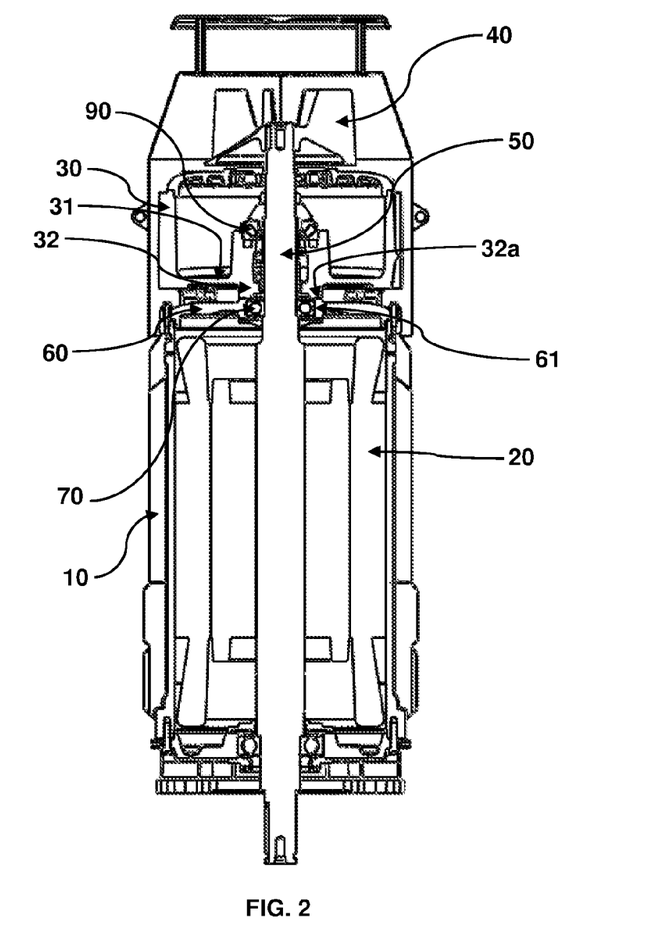
FIG. 2—is a longitudinal sectional view of a rotary electric machine according to a first embodiment of the present invention.

FIG. 2 illustrates a longitudinal section of the vertical motor. The lower part of the motor, including the lower cover and casing base, are common to state of the art vertical motors and are fully known to those skilled in the art. Thus, the lower part will not be described in detail here.

As can be seen in FIG. 2, the motor comprises a casing 10 that delimits an internal volume that houses a rotor/stator assembly 20, disposed on a main axis 50 of the machine. As known by those skilled in the art, the assembly is formed by a stator and a rotor, concentric to the stator, and arranged on the main axis.

The upper end of casing 10 is closed off by an intermediate closing cover 60.

In the embodiment of the invention shown in the figures, the intermediate closing cover 60 has at least one cavity 61 which, in an embodiment of the invention, may comprise a protruding edge 61a and an inner face 61b.

An oil tank 30 is disposed axially above the casing 10 of the rotor/stator assembly 20. The tank has a casing with an outer wall 31 axially spaced from the intermediate closing cover 60.

Figure 3:
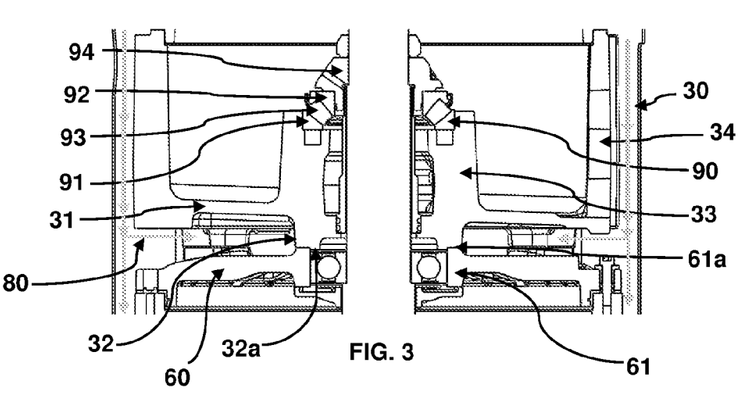
FIG. 3—is an enlarged longitudinal sectional view of the upper part of a rotary electric machine according to a first embodiment of the present invention.

As shown in the figures, the oil tank 30 casing comprises a body closed by a cover, defining an internal volume for receiving oil. In the preferred embodiment of the invention, the outer wall 31 is the bottom wall of the body. A roller bearing 90 is provided internally to the outer wall 31 of the oil tank 30 casing for connection between the static tank and the axis 50 of the machine. Thus, the roller bearing 90 is immersed in the oil inside the tank. As best illustrated in FIG. 3, the immersed roller bearing 90 comprises a static bottom lane 91, a rotary upper lane 92 and rolling elements 93, the upper lane 92 being mounted on a roller bearing bush 94. The construction and functioning of this type of roller bearing is known to those skilled in the art and will not be discussed in detail herein.

Figure 4:
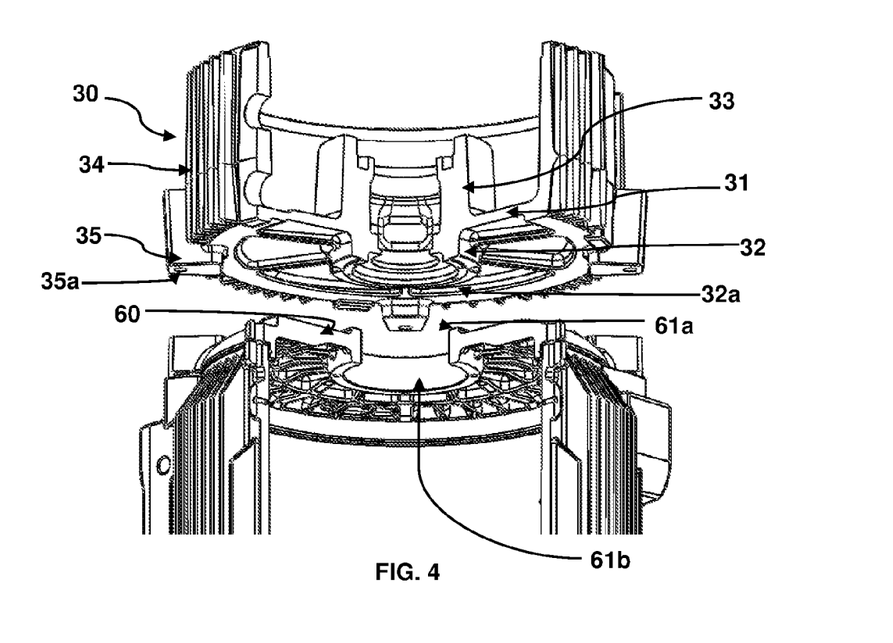
FIG. 4—is an enlarged and exploded view of the mounting elements between the oil tank and the intermediate closing cover of a rotary electric machine according to a first embodiment of the present invention, the pieces being illustrated with a half-cut for better visualization of the technical characteristics of assembly.

As best illustrated in FIGS. 3 and 4, the oil tank 30 casing body may further comprise a cylindrical inner wall 33 at the end of which the immersed roller bearing 90 is installed. In one embodiment of the invention, the cylindrical inner wall 33 is concentric to a cylindrical outer wall 34 of the tank body 30. It should be noted that the outer (bottom) wall 31, the cylindrical inner wall 33 and the cylindrical outer wall 34 are preferably constructed in one piece.

The outer wall 31 of the oil tank 30 casing is formed with at least one spacer protrusion 32 which is configured to contact the intermediate closing cover 60 to form the spacing between the outer wall 31 of the oil tank 30 casing and the intermediate closing cover 60 of the casing 10 of the rotor/stator assembly 20.

Figure 5:
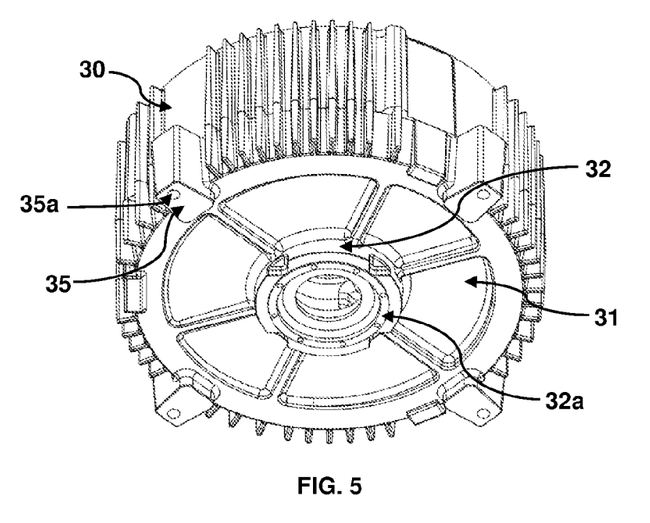
FIG. 5—is a bottom perspective view of the oil tank of a rotary electric machine according to a first embodiment of the present invention.

As best seen in FIGS. 3 to 5, in the embodiment shown in the figures, the spacer protrusion 32 is in the form of a circular wall 32 with a circular shoulder 32a. The circular wall 32 is configured to contact the protruding edge 61a of the cavity 61 of the intermediate cover 60, so that the circular shoulder 32a engages against the inner face 61b of the cavity.

The engagement of the circular shoulder 32a of the tank 30 against the inner face 61 b of the cavity 61 of the intermediate cover 60 ensures the radial attachment between the oil tank 30 and the intermediate cover 60.

With such construction, it is possible to achieve a simple and safe assembly of the spaced casings, even creating an accommodation structure for a guide roller bearing 70, which makes the connection between the intermediate cover 60 and the axis 50 of the machine.

A fan 40 is coupled to the machine axis 50, axially above the tank 30 casing.

The spacing formed between the intermediate closing cover 60 and the outer wall 31 of the tank forms a path 80 for the air flow from the fan 40 (see FIG. 3).

Thereby, the air flow path 80 thus formed allows the air flow from the fan 40 to flow adjacent an outer surface of the intermediate closing cover 60 towards the main axis 50 of the machine.

The air flow path 80 allows the passage of air from the fan through the side of the oil tank casing and for the spacing between the rotor/stator assembly 20 casing and the tank 30 casing, in order to promote, by thermal exchange caused by the convection of the air flow, the thermal insulation between the rotor/stator assembly 20 and the interior of the oil tank.

Thus, the oil tank 30 has as its main function essentially to provide the dissipation of the heat produced by the roller bearing immersed in oil 90.

In the state of the art casings, as shown in FIG. 1, the tank is in contact with the closing cover of the motor region, causing the heat generated in this region to dissipate through the oil tank, thus decreasing the efficiency of the oil in the cooling of the roller bearing immersed in oil 9.

The creation of air passage flows between the oil tank and the stator/rotor assembly region minimizes the effects of heat generated by the rotor/stator assembly on the oil tank, making the cooling efficiency of the roller bearing 90 optimized. Due to the air flow regions, there is an increase in the contact area between the casings and the air coming from the fan (common in motors and rotary electric machines), thus avoiding the direct transfer of heat from the stator region to the oil tank.

Figure 6:
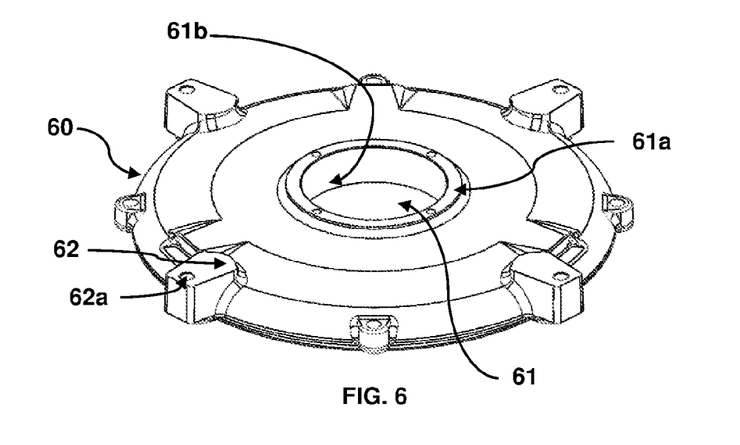
FIG. 6—is a top perspective view of the intermediate closing cover of a rotary electric machine according to a first embodiment of the present invention.

As best illustrated in FIGS. 4 to 6, in one embodiment of the invention the tank further comprises radial projections 35 with fastening holes 35a, and the intermediate cover 60 has corresponding radial projections 62 with fastening holes 62a. In this way, the axial fixation between the tank 30 and the intermediate cover 60 can be carried out by the fixing between the projections 35 and 62, for example, with the use of fastening elements, for example, screws, in the fastening holes 35a and 62a.

Of course, the fixing between the pieces could take place in any other equivalent way, for example, by fixing between the radial projections 35 and corresponding pre-existing fixing elements in the intermediate cover 60.

Figure 7:
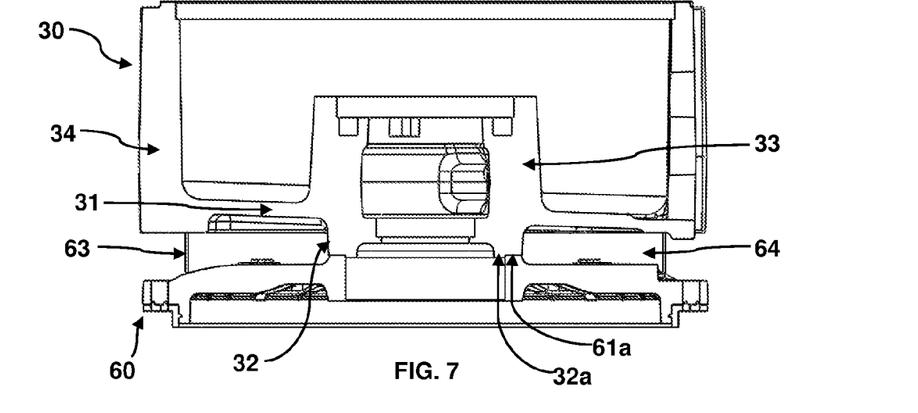
FIG. 7—is a longitudinal sectional view of the assembly between the oil tank and the intermediate closing cover of a rotary electric machine according to a second embodiment of the present invention.
Figure 8:
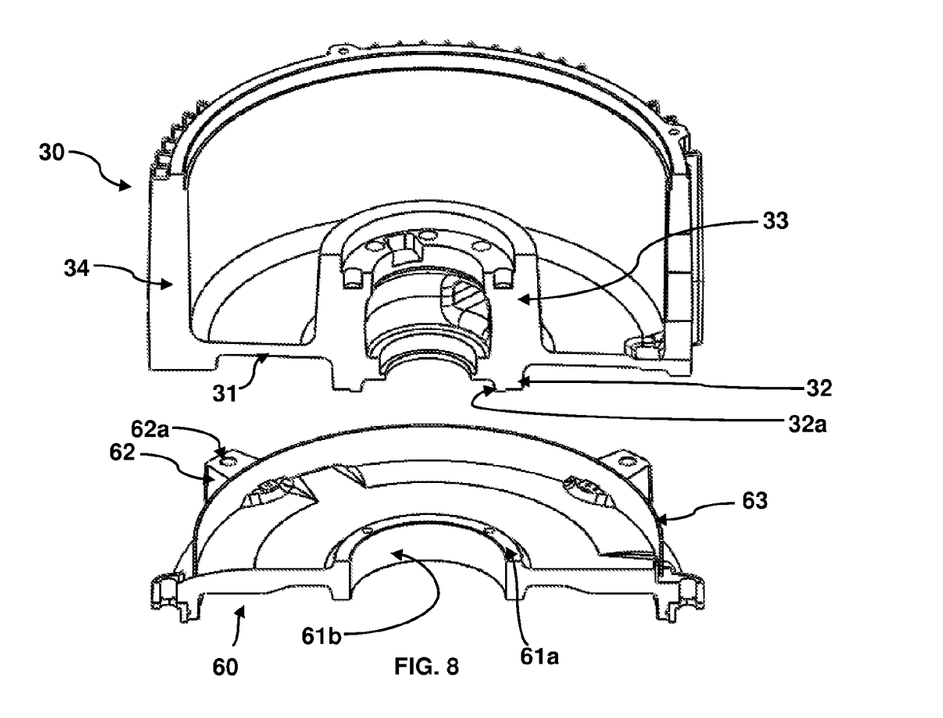
FIG. 8—is a perspective longitudinal sectional view of the assembly between the oil tank and the intermediate closing cover of a rotary electric machine according to a second embodiment of the present invention, the tank and the cover being shown separated.

FIGS. 7 and 8 show an embodiment of the present invention in which a thermally insulating material is disposed in the spacing formed between the intermediate closing cover 60 and the outer wall 31 of the tank 30.

The constructive characteristics of the tank 30 and the intermediate closing cover 60 are similar to the characteristics described in relation to FIGS. 2 to 6, with a containment element 63 being disposed in the space formed between the intermediate closing cover 60 and the outer wall 31 of the tank 30 to delimit a space 64 for receiving the thermally insulating material.

In the embodiment shown in FIGS. 7 and 8, the containment element is a containment plate 63 mounted to an outer surface of the intermediate closing cover 60. However, the containment element could be formed by mounting on the outer wall 31 of the oil tank casing, or even formed in one piece with the cover or with the outer wall of the tank.

Although the figures show a containment element 63 as a circular plate, the plate could have another shape, such as a square or rectangular shape.

The thermally insulating material can be, for example, rock wool, glass wool, ceramic insulator and epoxy resin.

The oil tank according to the present invention is thus a modular structure that can be applied to machines of different dimensions. As the function of the tank becomes the cooling of the roller bearing immersed in oil 90, with minimal influence of the heat generated by the rotor/stator assembly 20, the volume of this modular structure does not need to be varied, as the amount of oil required is calculated based on the roller bearing 90 only.

In fact, the present invention provides a solution that enables the use of standardized oil tanks, which can be used in rotary electric machines of different dimensions and specifications.

Figure 9:
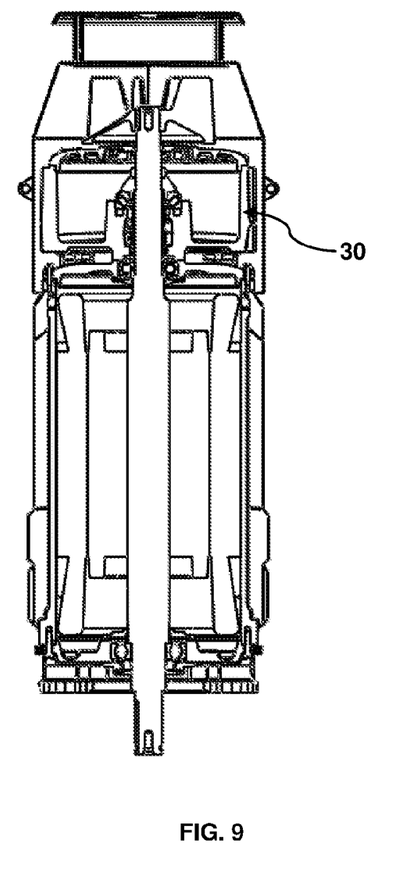
FIG. 9—is a longitudinal sectional view of a rotary electric machine according to the present invention.
Figure 10:
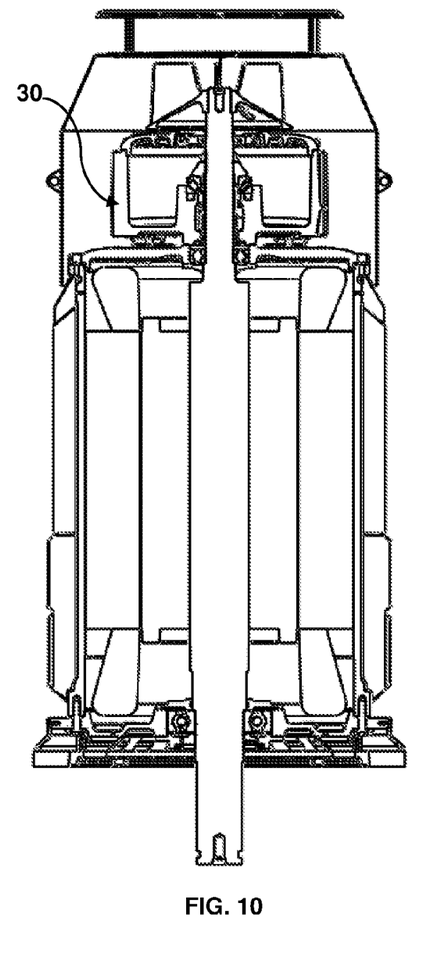
FIG. 10—is a longitudinal sectional view of another rotary electric machine according to the present invention.

In this sense, FIGS. 9 and 10 demonstrate rotary electric machines of different dimensions, comprising oil tanks 30 of the same volumes and geometries.

This feature is achieved by the fact that there is a spacing between the casings of the tank and of the stator/rotor assembly, which allows thermal insulation, either by delimiting an air flow path or by filling it with a thermally insulating material.

State of the art casings require larger oil tanks according with the increase in the rotor/stator assembly casings, since larger casings generate greater amounts of thermal energy, so it is necessary to provide greater amounts of oil to absorb such energy and still enable the cooling of the roller bearings.

As the present invention provides a system with thermal insulation between the casings of the tank and the stator/rotor assembly, the oil contained in the tank is essentially intended to cool the bearing. In this way, since there is no increase in the need to absorb thermal energy, the oil tank does not need to have its volume changed according to the size of the casing.

This characteristic means that the oil tanks—which are components of complex manufacture, in relation to the rear cover—can be standardized and unified for any dimensions and volumes of rotary electric machines casings, so that production and manufacturing are very facilitated.

Having described examples of embodiments of the present invention, it should be understood that the scope of the present invention encompasses other possible variations of the described inventive concept, being limited solely by the content of the claims only, including possible equivalents therein.

The invention claimed is:

1. A rotary electric machine of the type that comprises a casing that delimits an internal volume that houses a rotor/stator assembly, disposed on a main axis of the machine; an oil tank, and a fan coupled on the main axis, comprising:
   an intermediate closing cover that closes one end of the casing, intermediate closing cover comprising a cavity through which the main axis of the machine passes;
   the oil tank comprising a casing having an outer wall and a roller bearing immersed in oil disposed internally to the outer wall of the oil tank casing for coupling the oil tank to the main axis of the machine; and
   the outer wall of the oil tank casing having a spacer protrusion configured to contact the intermediate closing cover to form a spacing between the outer wall of the oil tank casing and the intermediate closing cover; the spacing between the outer wall of the oil tank casing and the intermediate closing cover creating a flow path that allows the air flow from the fan to flow adjacently to an outer surface of the intermediate closing cover towards the main axis of the machine;
   wherein the cavity of the intermediate closing cover has a protruding edge and an inner face; and
   wherein the spacer protrusion of the outer wall of the oil tank casing is in the form of a circular wall with a circular shoulder, wherein the circular wall is configured to contact the protruding edge of the cavity and the circular shoulder is configured to fit against the inner face of the cavity.

2. The rotary electric machine according to claim 1, wherein the cavity of the intermediate closing cover is configured to receive a guide roller bearing coupled to the main axis of the machine.

3. The rotary electric machine according to claim 1, wherein the oil tank casing further comprises a cylindrical inner wall and a cylindrical outer wall concentric, the cylindrical inner wall being configured for installation of the immersed roller bearing.

4. The rotary electric machine according to claim 1, wherein the outer wall of the oil tank casing has at least one radial projection with at least one fastening hole for axial attachment to the intermediate closing cover; and the intermediate closing cover has at least one radial projection having a fastening hole, and wherein the radial projection of the outer wall of the tank casing is attached to the corresponding radial projection of the intermediate closing cover.

5. The rotary electric machine according to claim 1, wherein the machine is a vertical motor, the intermediate closing cover is an upper cover, the oil tank is arranged axially above the intermediate closing cover, the outer wall of the oil tank casing is a lower wall, and the fan is arranged axially above the oil tank casing, the air flow from the fan descending externally the sides of the oil tank casing and flowing to the flow path formed between the lower wall of the oil tank casing and the intermediate closing cover.

6. A rotary electric machine of the type that comprises a casing that delimits an internal volume that houses a rotor/stator assembly, disposed on a main axis of the machine; an oil tank, and a fan coupled on the main axis, comprising:
   an intermediate closing cover that closes one end of the casing, intermediate closing cover comprising a cavity through which the main axis of the machine passes;
   the oil tank comprising a casing having an outer wall and a roller bearing immersed in oil disposed internally to the outer wall of the oil tank casing for coupling the oil tank to the main axis of the machine;
   the outer wall of the oil tank casing having a spacer protrusion configured to contact the intermediate closing cover to form a spacing between the outer wall of the oil tank casing and the intermediate closing cover; and
   a containment element being arranged at the spacing formed between the outer wall of the oil tank casing and the intermediate closing cover to delimit a space for receiving a thermally insulating material;
   wherein the cavity of the intermediate closing cover has a protruding edge and an inner face; and the spacer protrusion of the outer wall of the oil tank casing is in the form of a circular wall with a circular shoulder, wherein the circular wall is configured to contact the protruding edge of the cavity and the circular shoulder is configured to fit against the inner face of the cavity.

7. The rotary electric machine according to claim 6, wherein the containment element is a containment plate mounted on an outer surface of the intermediate closing cover.

8. The rotary electric machine according to claim 6, wherein the containment element is a containment plate mounted on the outer wall of the oil tank casing.

9. The rotary electric machine according to claim 6, wherein:
   the cavity of the intermediate closing cover is configured to receive a guide roller bearing coupled to the main axis of the machine;
   the oil tank casing further comprises a cylindrical inner wall and a cylindrical outer wall concentric, the cylindrical inner wall being configured for installation of the immersed roller bearing; the outer wall of the oil tank casing has at least one radial projection with at least one fastening hole for axial attachment to the intermediate closing cover; and
   the intermediate closing cover has at least one radial projection having a fastening hole, and wherein the radial projection of the outer wall of the tank casing is fixed to the corresponding radial projection of the intermediate closing cover.

10. The rotary electric machine according to claim 6, wherein the machine is a vertical motor, the intermediate closing cover is an upper cover, the oil tank is arranged axially above the intermediate closing cover, the outer wall of the oil tank casing is a lower wall, and the fan is arranged axially above the oil tank casing, and the containment element is disposed between the lower wall of the oil tank and the intermediate closing cover.

11. An oil tank for a rotary electric machine of the type that comprises a casing that delimits an internal volume that houses a rotor/stator assembly, disposed on a main axis of the machine; the oil tank, and a fan coupled on the main axis, comprising:

a casing having an outer wall shaped with at least one spacer protrusion, the spacer protrusion configured to contact an intermediate closing cover of the casing of the electric machine to form a spacing between the outer wall of the oil tank casing and the intermediate closing cover;

wherein the outer wall of the oil tank casing has at least one radial projection having a fastening hole for axial attachment to the intermediate closing cover; and the tank casing further comprises a cylindrical inner wall and a cylindrical outer wall concentric, the cylindrical inner wall being configured for installation of an inner immersed roller bearing.

12. The oil tank according to claim 11, wherein the spacer protrusion of the outer wall of the oil tank casing is in the form of a circular wall with a circular shoulder for radially attaching the outer wall to a cavity of the intermediate closing cover.

13. The oil tank according to claim 11, wherein a containment element is provided on the outer wall of the oil tank casing.

* * * * *